United States Patent [19]
Schultz

[11] 3,930,750
[45] Jan. 6, 1976

[54] WIND POWER PLANT

[76] Inventor: Wilderich C. Schultz, 696 Wrelton Drive, San Diego, Calif. 92109

[22] Filed: Apr. 8, 1974

[21] Appl. No.: 459,033

[52] U.S. Cl. .................................................. 416/197
[51] Int. Cl.² ............................................... F03D 3/00
[58] Field of Search ...................................... 416/197

[56] References Cited
UNITED STATES PATENTS

| | | | |
|---|---|---|---|
| 303,585 | 8/1884 | Morehouse | 416/197 |
| 625,614 | 5/1899 | Thompson | 416/197 X |
| 1,359,180 | 11/1920 | Levesque | 416/197 |
| 1,609,883 | 12/1926 | Potts | 416/197 X |
| 1,812,741 | 6/1931 | Espinosa | 415/2 |
| 2,252,788 | 8/1941 | Sparr | 416/197 |
| 2,518,611 | 8/1950 | Geiger | 416/197 |

FOREIGN PATENTS OR APPLICATIONS

| | | | |
|---|---|---|---|
| 78,640 | 1950 | Czechoslovakia | 416/197 |
| 913,964 | 9/1946 | France | 416/197 |
| 916,370 | 12/1946 | France | 416/197 |
| 19,401 | 1891 | United Kingdom | 416/197 |
| 265,754 | 1927 | United Kingdom | 416/197 |

*Primary Examiner*—Everette A. Powell, Jr.

[57] ABSTRACT

A power plant of the windmill type is provided which includes a multi-arm horizontal propellor unit mounted for rotation about a vertical axis. Each propellor vane of the unit includes an external shell configured to form an elongated trough with an open trailing edge. A webbing is mounted within the shell to form a series of cells which are exposed through the open trailing edge. The shell has a parabolic cross section, and its leading edge has an airfoil shape. The propellor unit responds to wind from any direction so that the need for wind tracking mechanisms is obviated. Moreover, the construction is such that gyroscopic vibrations due to wind changes are also minimized.

2 Claims, 6 Drawing Figures

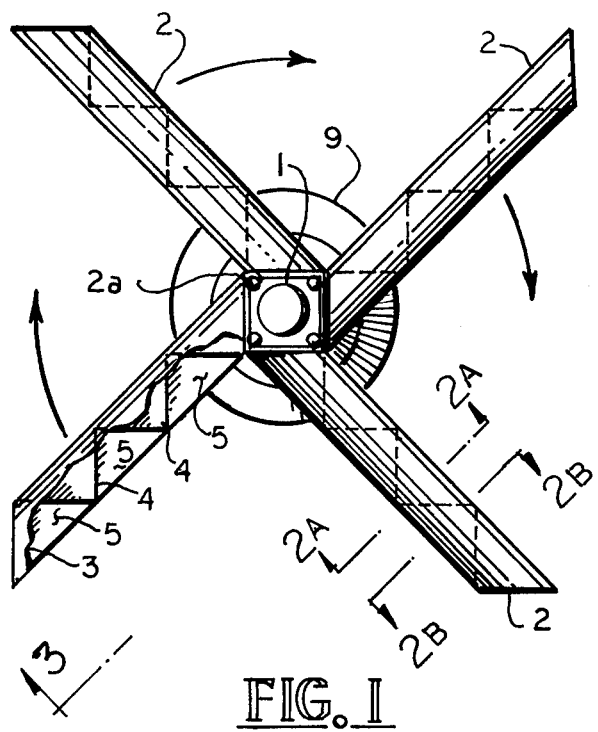
FIG. 1
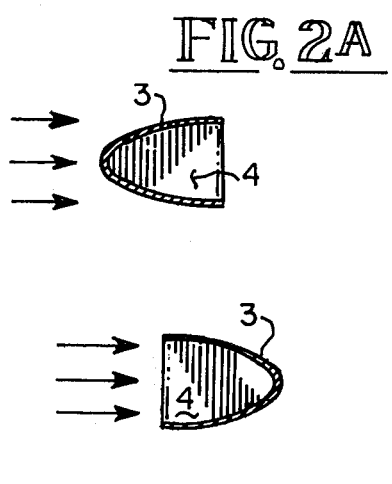
FIG. 2A
FIG. 2B
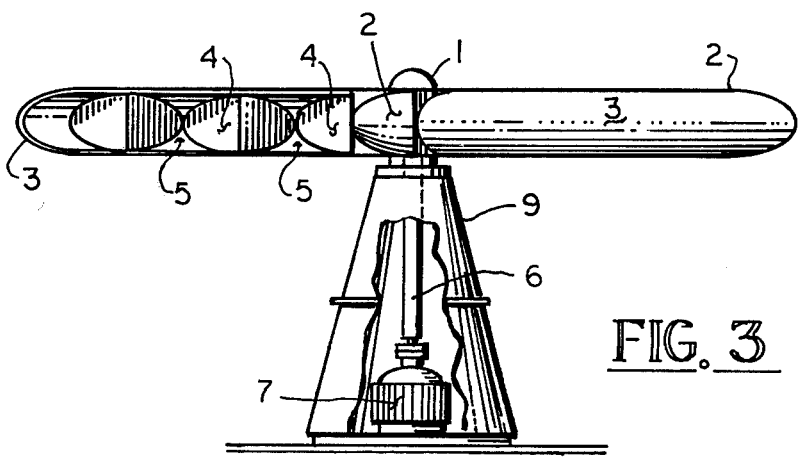
FIG. 3

WIND POWER PLANT

BACKGROUND OF THE INVENTION

The use of the kinetic energy in the earth's atmosphere to perform useful work has been practiced for many hundreds of years. This use is carried out by windmills which extract wind power from horizontal air movements along the earth's surface due to atmospheric energy changes.

In the past, windmills have usually extracted power from the wind by propellors in the form of sails, flats, or foils, positioned on rotary mounts in a vertical plane for rotation about a horizontal axis. Such prior art windmills also usually include an appropriate tracking mechanism which acts continually to turn the propellor unit into the wind.

With the development of the airfoil propellor for aircraft, this form of propellor has come into widespread use in windmills for the last 50 years.

Windmills for the generation of electric power have been introduced into commercial use with the advent of the storage battery. The propellors for such windmills are usually mounted directly on the shaft of an electric generator, and the resulting power plant constitutes an inexpensive source of electric power, in which the batteries are charges so long as the wind is blowing to store electricity for use on calm days.

In the operation of a windmill, the rotating vanes intercept a mass of air entering at a given velocity. Adjacent air moves at a constant velocity past the area swept by the vanes, but the intercepted air decellerates in transferring energy to the vanes. This decellerated portion of the air must retain enough velocity to exit from the vanes. This means that the windmill cannot extract all the kinetic energy from the approaching wind. However, downstream from the windmill, the decellerated air mixes turbulently with the adjacent air, and the resulting energy exchange serves to reduce back pressure to some extent.

As mentioned above, the invention is concerned with a windmill type of power plant which comprises a multiple-vane propellor unit rotating in a horizontal plane about a vertical axis. The horizontal propellor unit of the invention may be mounted on the top of an appropriate supporting structure. The propellor unit serves to drive an electric generator, pump, or instrumentality, positioned within the supporting structure, the drive being either direct of through an appropriate gear box.

The horizontal propellor unit of the invention comprises a hub with a plurality of vanes mounted for rotation about the hub. Each of the vanes has a webbing member of zig-zag shape positioned within an external shell to form a series of triangular shaped cells or pockets. The shell has a parabolic cross-section, with an open trailing edge, and with a leading edge of a symmetrical airfoil shape. The internal cells provide structural rigidity for the shell and reduce vortex disturbances due to angular airflow. The propellor unit of the invention responds to wind from any direction, so that there is no need for tracking mechanism to maintain the unit turned into the wind.

The propellor unit of the invention may be constructed of fiberglass, light metal, or any other suitable material. The unit is simple, light, and inexpensive, and it is easy to build and to install.

BRIEF DESCRIPTION OF THE DRAWINGS

FIG. 1 is a top plan view of a propellor unit constructed in accordance with one embodiment of the invention, and with one of the propellor vanes broken away to reveal the internal cell structure;

FIG. 2A is a cross-section of one of the vanes of the propellor unit of FIG. 1, taken along the lines 2a–2a of FIG. 1, and showing the airflow pattern at the leading edge of the vane;

FIG. 2B is a cross-section taken along the lines 2b–2b of FIG. 1, and showing the airflow pattern at the trailing edge of the vane;

FIG. 3 is a side elevation of the unit of FIG. 1, taken essentially along the lines 3–3 of FIG. 1;

DETAILED DESCRIPTION OF THE ILLUSTRATED EMBODIMENT

Figure 4:
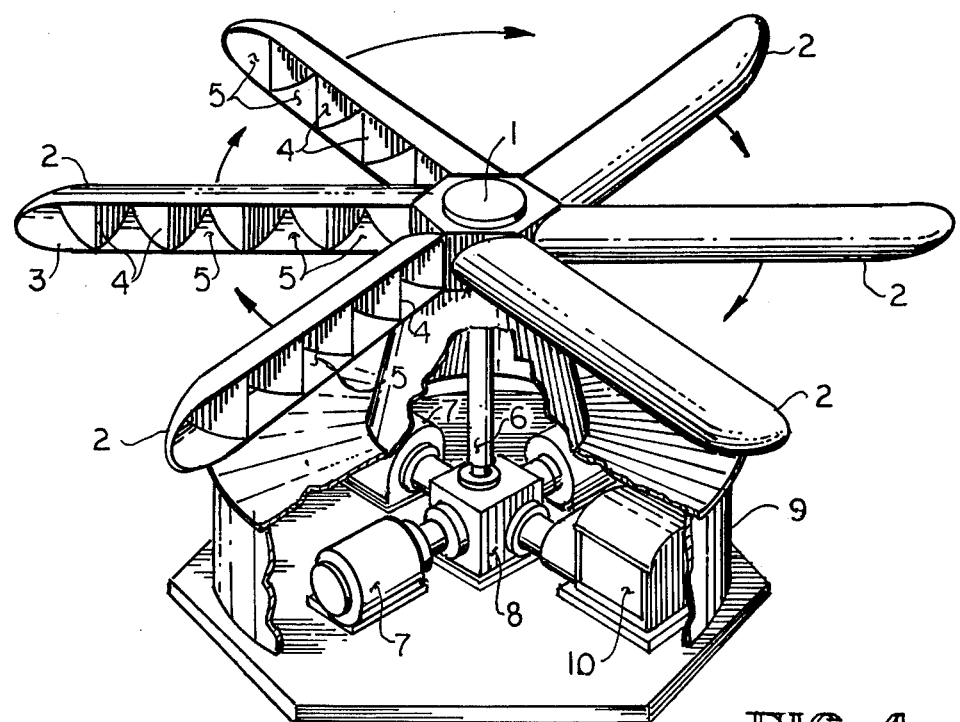
FIG. 4 is a perspective representation, partly broken away, of a six vane propellor unit in accordance with the invention, and which incorporates a multiplicity of instrumentalities within the supporting structure driven by the propellor unit to constitute a power plant.

The power plant shown in FIGS. 1 and 3 includes a propellor unit constructed in accordance with the invention, in one of its embodiments. The propellor unit, in turn, includes a hub 1 which is rotatable about a vertical axis, and which supports a plurality of radially extending trough-like cantilever vanes 2 in a horizontal plane. The radial vanes are supported on the hub by means of appropriate studs 2a. Each of the vanes 2 has an external shell 3 with an open trailing edge to provide a trough-like configuration for the vane. The shell has a parabolic cross-section, and a leading edge in the shape of a symmetrical airfoil.

A webbing member 4 is mounted in the shell 3 of each of the vanes 2 and, as shown, the webbing member has a zig-zag shape to form a series of cups or cells 5. The cells 5 have a triangular shape, and are exposed through the open trailing edge of the shell.

The propellor unit of FIGS. 1 and 2 is supported on an appropriate structure 9. The propellor unit is coupled to a vertical drive shaft within the structure which, in turn, is coupled to an instrumentality 7 which may, for example, be an electric generator.

As best shown in FIG. 1, the open trailing edge of each vane 2 is aligned with the vertical axis of rotation of the hub 1. This provides for an even centrifugal stress distribution across the hub, and it also provides maximum leverage of force-torque transmission from the vanes to the hub.

The flow pattern of the wind at the leading edge of shell 3 is shown in FIG. 2A. The flow pattern of the wind at the trailing edge of the shell 3 is shown in FIG. 2B. It will be appreciated that the airfoil shape of the leading edge of the shell 3 is such that the wind flow has a minimum of turbulence and its flow pattern is such to reduce drag to a mininum. Also, the wind flow pattern at the open trailing edge of the shell 3, and in the interior of the shell is such that back pressure is minimized. As mentioned above, the zig-zag webbing member 4 within the shell, and which forms the triangular shaped cells or pockets 5, provides rigidity for the cell and also reduces vortex disturbances in the presence of angular airflow.

The result is a propellor unit which is mounted in a horizontal plane for rotation about a vertical axis, and which operates efficiently and responds to air flow from any direction, so as to obviate the need for providing extraneous mechanisms for continually turning the propellor unit into the wind.

In the embodiment of FIG. 4, the propellor unit includes six radial vanes 2. The shaft 6 is coupled to a gear box 8, instead of being directly connected to the instrumentality 7, as was the case in the embodiment of FIG. 3. The gear box 8 in the embodiment of FIG. 4 is coupled to a plurality of instrumentalities 7A, as shown. A standby internal combustion engine 10 is also provided to drive the instrumentality 7 at times when wind pressure is insufficient.

Figure 5:
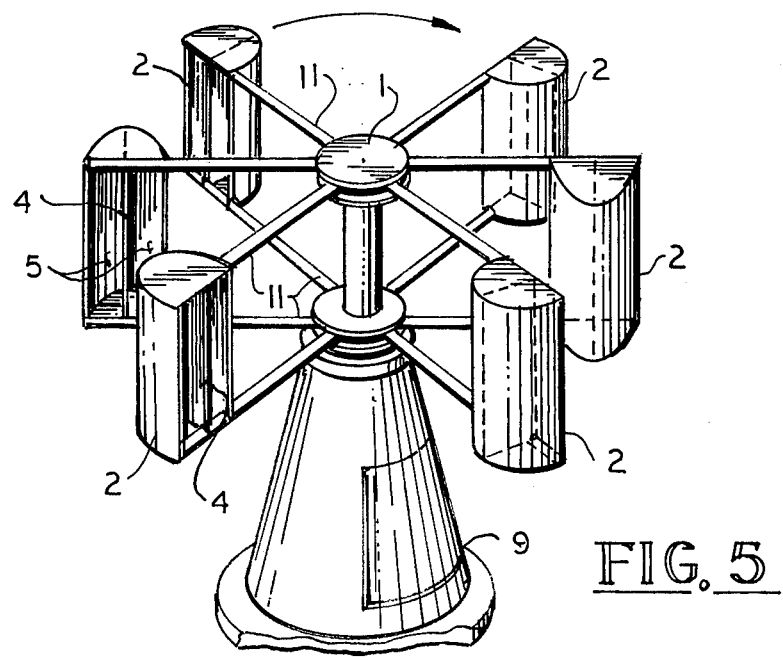
FIG. 5 is a perspective view of a second embodiment of the invention.

In the embodiment of FIG. 5, the vanes 2 are mounted vertically and spaced a particular radial distance from the hub 1 by an appropriate support structure 11. The support structure 11 is rotatably mounted on the hub 1.

The invention provides, therefore, a simple and inexpensive propellor unit for use in a power plant, and which operates with a minimum of components, and with a high degree of efficiency, to provide a driving torque for the power plant.

It will be appreciated that although particular embodiments of the invention have been shown and described, modifications may be made. It is intended in the claims to cover the modifications which come within the spirit and scope of the invention.

What is claimed is:

1. A power plant of the windmill type comprising: a supporting structure, a propeller unit mounted on said supporting structure for rotation about a vertical axis and including a hub, a plurality of vanes affixed to said hub, each of said vanes having a shell of a generally parabolic cross-section defining a leading edge with a symmetrical air foil configuration and further defining an open trailing edge, and a zig-zag shaped webbing member mounted within said shell to define a series of essentially triangular individual cells extending the length of the shell and exposed to the open trailing edge thereof.

2. The power plant defined in claim 1, in which each of said vanes extends as a cantilever radially from said hub in a horizontal plane.

* * * * *